United States Patent
Yamada et al.

(10) Patent No.: US 9,222,447 B2
(45) Date of Patent: Dec. 29, 2015

(54) CHARGE AIR COOLER CONTROL SYSTEM AND METHOD

(71) Applicant: Ford Global Technologies, LLC, Dearborn, MI (US)

(72) Inventors: Shuya Shark Yamada, Novi, MI (US); Jim Raymond Palm, Ypsilanti Township, MI (US); Kristofor Robert Norman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/830,141

(22) Filed: Mar. 14, 2013

(65) Prior Publication Data

US 2014/0026870 A1   Jan. 30, 2014

Related U.S. Application Data

(60) Provisional application No. 61/676,132, filed on Jul. 26, 2012.

(51) Int. Cl.
| | | |
|---|---|---|
| *F02M 15/00* | (2006.01) | |
| *F02M 31/20* | (2006.01) | |
| *F02B 29/04* | (2006.01) | |
| *F02M 25/07* | (2006.01) | |

(52) U.S. Cl.
CPC ............ *F02M 31/20* (2013.01); *F02B 29/0418* (2013.01); *F02B 29/0468* (2013.01); *F02M 25/0707* (2013.01); *F02M 25/0713* (2013.01); *Y02T 10/146* (2013.01)

(58) Field of Classification Search
CPC ............ F02M 25/0732; F02M 35/088; F02M 35/1038; F02B 29/04; F02D 41/0007
USPC ......... 123/542, 539, 540, 556, 563, 565, 528; 165/55, 56, 96, 140
See application file for complete search history.

(56) References Cited

U.S. PATENT DOCUMENTS

| | | | |
|---|---|---|---|
| 5,152,144 A | 10/1992 | Andrie | |
| 6,978,772 B1 * | 12/2005 | Dorn ................... | F02M 25/0732 123/568.12 |
| 7,628,144 B2 * | 12/2009 | Vetrovec ................ | F02B 33/44 123/541 |
| 7,845,338 B2 * | 12/2010 | Smith ................ | F02M 25/0728 123/568.12 |
| 7,845,339 B2 * | 12/2010 | Cecil et al. ............... | 123/568.12 |
| 7,886,724 B2 | 2/2011 | Tai et al. | |
| 8,020,536 B2 * | 9/2011 | Kardos ............... | F02B 29/0475 123/542 |
| 8,025,045 B2 * | 9/2011 | Pettersson .............. | B60K 11/04 123/41.59 |
| 8,225,849 B2 * | 7/2012 | Hendrix .............. | F02B 29/0418 123/568.12 |
| 8,230,843 B2 * | 7/2012 | Kurtz .................. | F02D 41/0065 123/568.12 |
| 8,534,267 B2 * | 9/2013 | Hassdenteufel ... | F02M 25/0721 123/568.12 |

(Continued)

FOREIGN PATENT DOCUMENTS

DE   102008009152 A1 *   8/2009
EP   1853804 B1   9/2011

*Primary Examiner* — Lindsay Low
*Assistant Examiner* — Long T Tran
(74) *Attorney, Agent, or Firm* — Julia Voutyras; Alleman Hall McCoy Russell & Tuttle LLP

(57) ABSTRACT

A charge air cooler, a system to control condensation within a plurality of cooling tubes of a charge air cooler, and a method are disclosed. The system includes an air flow control arrangement configured to selectively ensure a flow rate of charge air through each individual cooling tube is either essentially zero or above a predetermined minimum flow rate in accordance with predetermined operating conditions of the engine.

11 Claims, 7 Drawing Sheets

(56) References Cited

U.S. PATENT DOCUMENTS

| | | | |
|---|---|---|---|
| 2004/0244782 A1 | 12/2004 | Lewallen | |
| 2005/0081523 A1* | 4/2005 | Breitling | F02M 29/0418 60/599 |
| 2007/0089407 A1* | 4/2007 | Smith | F02M 25/0728 60/321 |
| 2010/0095939 A1* | 4/2010 | Geskes | F02B 29/0475 123/556 |
| 2010/0229842 A1* | 9/2010 | Pettersson et al. | 123/568.12 |
| 2013/0042842 A1* | 2/2013 | Vassallo | F02M 25/0728 123/568.12 |
| 2013/0263828 A1* | 10/2013 | Cockerill | F02B 29/0418 123/540 |

* cited by examiner

CHARGE AIR COOLER CONTROL SYSTEM AND METHOD

CROSS REFERENCE TO RELATED APPLICATIONS

The present application claims priority to U.S. Provisional Patent Application No. 61/676,132 filed on Jul. 26, 2012, the entire contents of which are incorporated herein by reference for all purposes.

FIELD

The present application relates to methods and systems for controlling condensation levels in charged engines in order to avoid sudden excess ingestion of water during combustion, and specifically methods and systems wherein a rate of flow of charge air through individual cooling tubes of the charge air cooler is controlled to provide rates of condensation and evaporation that tend to mitigate ingestion surges.

BACKGROUND AND SUMMARY

Many internal combustion engines include turbochargers, or superchargers configured to force more air mass into an engine's intake manifold and combustion chamber by compressing intake air with a compressor driven by a turbine disposed to capture energy from the flow of the engine exhaust gas. However, the compression of the intake air tends to heat it which tends to reduce the density of this charge air. It is known to use a charge air cooler to compensate for heating caused by supercharging. Charge air coolers may be used with gasoline engines and with diesel engines.

During operation in humid and cooler climates, the size of the CAC may be such that water vapor in the air will condense out and be stored in the CAC. When the air demand of the engine reaches a high enough velocity it can strip the condensed water out of the CAC and ingest it into the engine. However, if too much water is ingested into the engine too rapidly the engine may misfire. Sometimes the misfiring can be extreme.

Efforts have been made to reduce condensation in a charge air cooler. For example, U.S. Pat. No. 7,886,724 to Tai, et al. discloses a charge air cooler arrangement with a cooler bypass. The arrangement causes inlet air to flow through a first charge air cooler downstream from a second cooler and a bypass line arranged for bypassing the second cooler. The temperature of the inlet air is adjusted downstream from the first charge air cooler by adjusting an amount of inlet air flow through the second cooler and the bypass line.

The inventors herein have recognized a number of problems with this approach. One example problem is that when inlet air flows through the bypass line the first charge air cooler does not cool the air to temperatures as low as would otherwise be desirable. Another problem with this approach is that it requires using two charge air coolers thereby increasing material, production, packaging and other costs.

The inventors herein have recognized that under various pressure conditions charge air condensate can be stripped from the cooling tubes of the charge air cooler before excess condensation can build up if the charge air flow rate remains above a certain minimum. For example, at 1 bar atmosphere, a minimum air velocity of 13 m/s at various engine speeds may tend to remove water continuously and prevent excess condensation. And the rate of water stripping will increase with higher charge air flow rates. However, at slow engine speeds the charge air flow rate through the cooling tubes may be too slow to prevent excess condensation buildup. Accordingly, embodiments in accordance with the present disclosure may be configured to ensure that the flow rate in each individual cooling tube, where condensation may occur, may be kept above a predetermined minimum.

Embodiments may provide a system to control condensation within a plurality of cooling tubes of a charge air cooler for use with an engine. The system may includes an air flow control arrangement configured to selectively ensure a flow rate of charge air through each individual cooling tube is either essentially zero or above a predetermined minimum flow rate in accordance with predetermined operating conditions of the engine. In this way excess condensation may be avoided, and condensation that may be present may be continually stripped from individual cooling tubes such that excess condensation will not be passed to the combustion chamber of the engine. In this way engine misfire due to excessive water ingestion may be avoided.

Embodiments may also provide a charge air cooler for use with an engine. The charge air cooler may include a plurality of regulate-able cooling tubes configured to receive a charge air from a respective first side of each cooling tube and to output the charge air from a respective second side of each cooling tube. The charge air cooler may also include a flow regulating arrangement configured to pass the charge air through the plurality of regulate-able cooling tubes in a selective way to provide either no flow through a particular tube, or flow at a flow rate above a preselected minimum flow rate. The charge air cooler may also include one or more additional cooling tubes configured receive cooling air when the engine is operable. The regulate-able cooling tubes and the additional cooling tubes may all be included in the same charge air cooler.

Embodiments may also provide a method of controlling condensation accumulation within cooling tubes included in a single charge air cooler. The charge air cooler may be configured for providing cooled charge air to an engine. The method may include controlling passage of the charge air through each of the cooling tubes in order to keep a flow rate in each individual cooling tube to either above a predetermined minimum flow rate, or at substantially no flow in accordance with operating conditions of the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
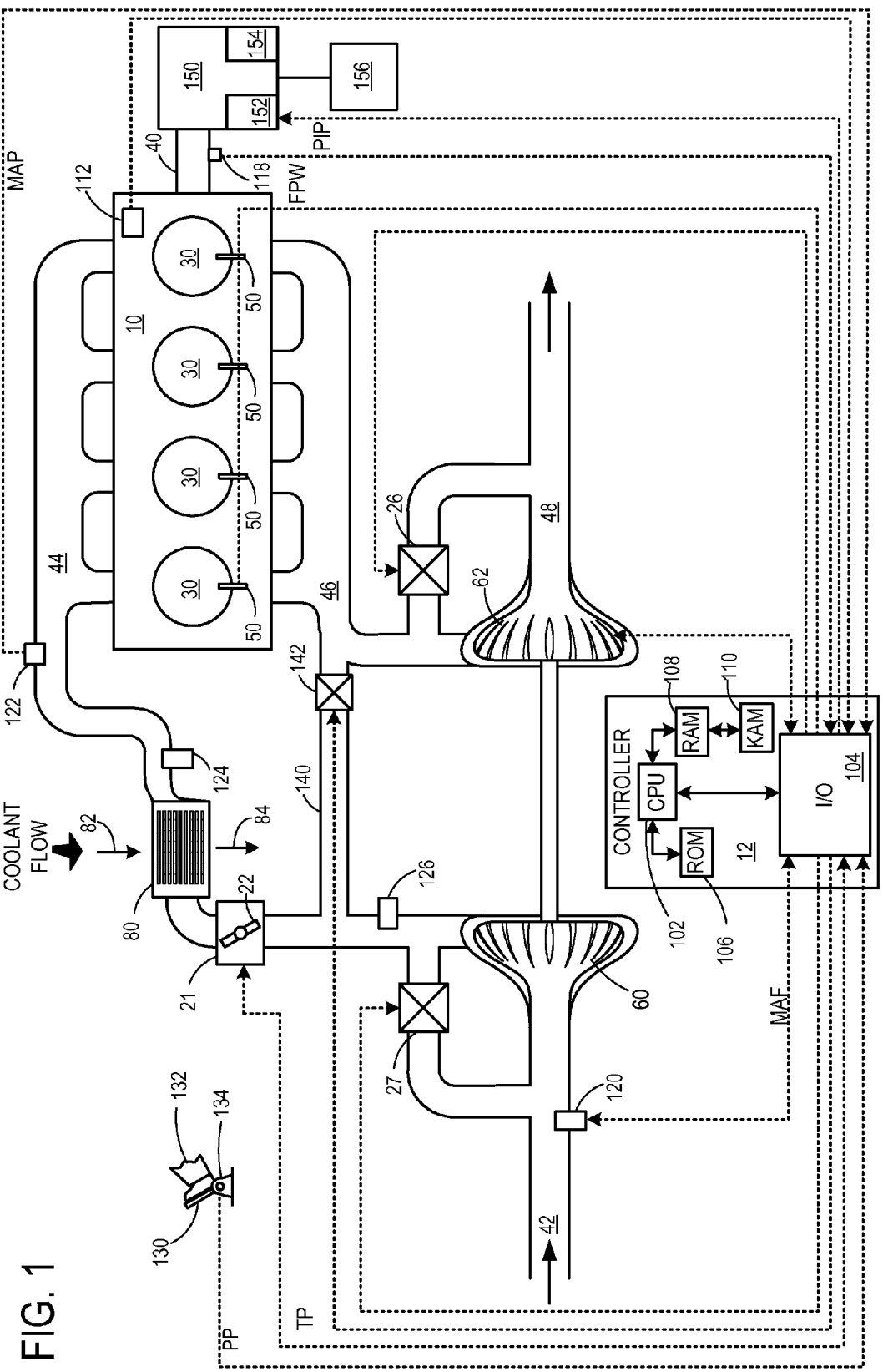
FIG. 1 shows an example vehicle system layout, including an air intake system and a charge air cooler arrangement in accordance with the present disclosure.

FIG. 1 is a schematic diagram showing an example engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system 150. Further, a starter motor may be coupled to crankshaft 40 via a flywheel to enable a starting operation of engine 10.

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. A controller may vary the transmission gear (e.g., upshift or downshift the transmission gear) to adjust an amount of torque conveyed across the transmission and torque converter to vehicle wheels 156 (that is, an engine shaft output torque).

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. CAC 80 may be a variable volume CAC. Hot charge air from the compressor 60 enters the inlet of the CAC 80, cools as it travels through the CAC, and then exits to enter the engine intake manifold 44. Ambient air flow from outside the vehicle may enter engine 10 through a vehicle front end and pass across the CAC, to aid in cooling the charge air. Additionally, or alternatively, coolant may flow through internal cooling tubes of the CAC to cool the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Under certain conditions, condensate may collect at the bottom of the CAC and then be purged into the engine during conditions of increased airflow. If the condensate is introduced at once into the engine during an acceleration event, it may increase the chance of engine misfire due to the ingestion of water.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing various methods of the engine. Further, controller 12 may control a condensate control system in the CAC, as discussed further below.

As mentioned above, intake passage 42 may include a charge air cooler 80 (CAC) (e.g., an intercooler) to decrease the temperature of the turbocharged or supercharged intake gasses. A flow of coolant shown by an incoming flow 82 and an outgoing flow 84, which may be passed over a plurality of cooling tubes (not shown), is shown with arrows; i.e. the charge air cooler 80 may include a coolant inlet 82 configured to receive coolant and a coolant outlet 84 configured to expel coolant. The source of the incoming flow 82 and the destination of the outgoing flow 84 have been omitted from the figure. The coolant fluid that flows as incoming flow 82 and outgoing flow 84 may be air or another fluid such as water, or an appropriate chemical coolant, or a mixture thereof. In one case the charge air cooler 80 may be referred to as water cooled in another it may be referred to as air cooled. The coolant in the charge air cooler 80 may be circulated in a coolant passage (not shown). It will be appreciated that the coolant passage may have geometric features configured to aid thermal transfer between the intake passage 42 and the coolant passage. In this way, heat may be drawn away from the intake passage 42 via the plurality of cooling tubes of the charge air cooler 80. Thus, the temperature of the intake air delivered to the cylinders 30 may be reduced increasing the air density, and increasing combustion efficiency.

Embodiments in accordance with the present disclosure may provide a system and an apparatus that may ensure that when charge air is passed through the cooling tubes, it is passed at least at a minimum air velocity regardless of engine speed loads to prevent water condensation build up, even at low speeds. In this way engine efficiency requirements may be better met, and sudden excess ingestion of the charge air cooler condensate may be avoided. Example details are illustrated in FIG. 1 and also in the following figures. Some variations are also illustrated. Embodiments shown in FIGS. 2-6 may provide a system 210 to control condensation within the plurality of cooling tubes 208 of the charge air cooler 80 for use with an engine such as example engine 10.

Figure 2:
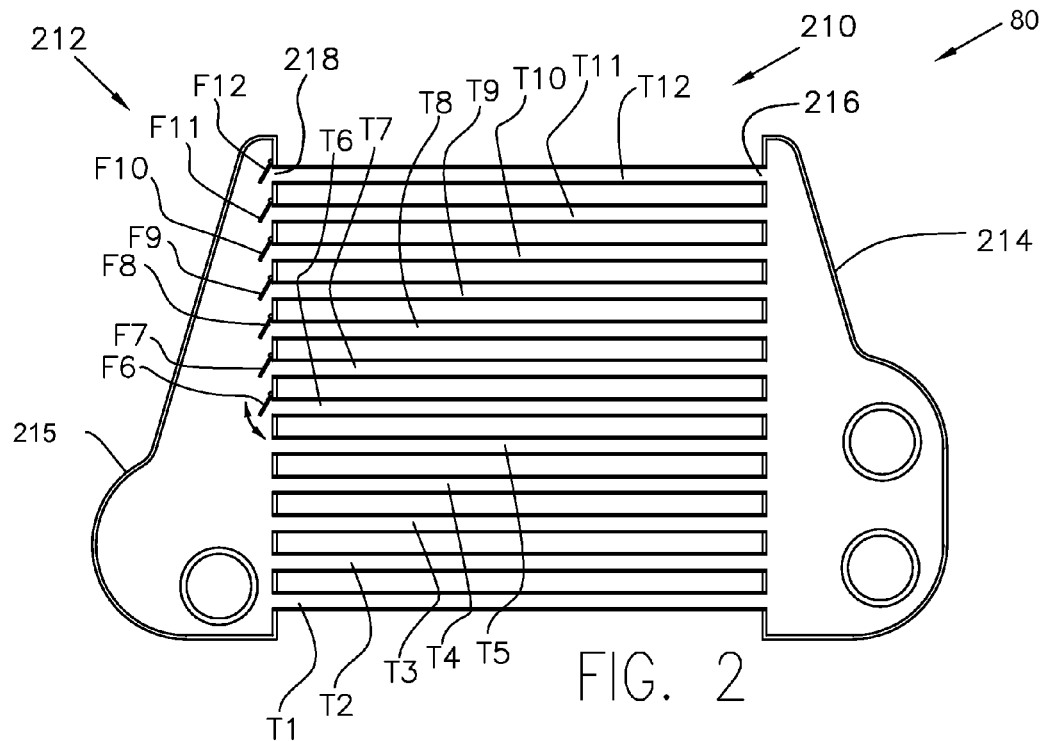
FIG. 2 is a cross sectional view of a charge air cooler arrangement showing an example air flow control arrangement in accordance with the present disclosure.
Figure 3:
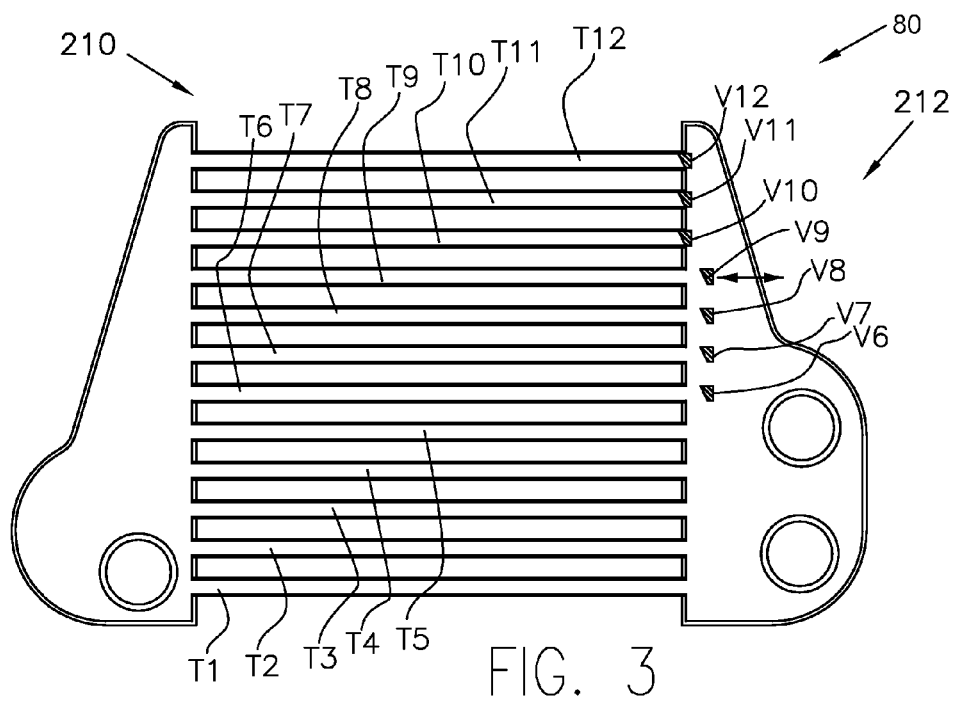
FIG. 3 is a cross sectional view of a charge air cooler arrangement showing another example air flow control arrangement in accordance with the present disclosure.

Referring now also to FIGS. 2 and 3, which are cross sectional views illustrating an example charge air control system in accordance with the present disclosure. The system 210 may include an air flow control arrangement 212 configured to selectively ensure that a flow rate of charge air through each individual cooling tube T1-T12 is either essentially zero or above a predetermined minimum flow rate in accordance with predetermined operating conditions of the engine 10. The essentially zero flow may be flow less than 1% of the maximum flow. Further, the minimum flow rate may be a minimum flow rate above zero set based on experimental testing. The air flow control arrangement 212 may regulate flow, by for example restricting flow, to some of the cooling tubes, for example tubes T6 through T12. Flow may be allowed to readily pass through other "non-regulated" tubes T1 through T5. The ratio of the number of "regulate-able" tubes T6-T12 to the total number of tubes T1-T12 may be determined by first determining what size the restricted flow path, i.e. just through the non-regulated tubes T1 through T5, should be to ensure that flow through just those tube is above a predetermined minimum flow rate; even at low air flow, i.e. low engine conditions. Other considerations may be used. One example predetermined minimum flow rate may be approximately 13 m/s.

The predetermined operating conditions of the engine 10 may include one or more of: ambient temperature external to the charge air cooler 80; ambient pressure external to the charge air cooler 80; relative humidity external to the charge air cooler 80; engine temperature; temperature of the charge air cooler 80; temperature, and/or pressure, and/or relative humidity, and/or moisture content of the charge air downstream from the turbocharger; temperature, and/or pressure, and/or relative humidity, and/or moisture content of the charge air upstream from the turbocharger; temperature, and/or pressure, and/or relative humidity, and/or moisture content in an inlet tank 214 of the charge air cooler; and temperature, and/or pressure, and/or relative humidity, and/or moisture content in an outlet tank 215 of the charge air cooler. Other conditions may also factor into, or determine, the operation of the air flow control arrangement 212.

External to the charge air cooler may refer to ambient conditions outside of the engine, and may refer to conditions external to the vehicle. The conditions may be measured by sensors currently included with vehicle designs, or additional sensors currently not current in use in typical vehicles built today. The conditions may be measured in the inlet air upstream from turbocharger. In some cases the environmental conditions of the engine, and/or the vehicle may be made available via a computer network such as the Internet. The conditions sensed by the sensors may be processed through or processed by, or interpreted by, the controller 12.

The air flow control arrangement 212 may include a plurality of valves V6-V12 as shown schematically in FIG. 3. Each valve V6-V12 may be configured to selectively provide access to or to restrict access to a respective one or more of the plurality of cooling tubes T6-T12. As illustrated in FIG. 2 the plurality of valves V6-V12 may be a plurality of flaps F6-F12.

Embodiments may provide a charge air cooler 80 for use with an engine 10. The charge air cooler 80 may include a plurality of regulate-able cooling tubes T6-T12 configured to receive a charge air from a respective first side 216 (e.g., inlet side) of each cooling tube and to output the charge air from a respective second side 218 of each cooling tube T6-T12. An air flow control arrangement 212 (e.g., air flow regulating arrangement) may be configured to pass the charge air through the plurality of regulate-able cooling tubes T6-T12 in a selective way to provide either no flow through a particular tube, or flow at a flow rate above a preselected minimum flow rate. The charge air cooler 80 may also include one or more additional cooling tubes T1-T5 that may be configured receive cooling air when the engine is operable. In this way whenever the engine is in operation, and in particular when the turbocharger is operable charge air may always be able to pass at least through the one or more additional cooling tubes.

The system 210 may include a plurality of valve actuators configured to either open or to close respective selected individual valves. One or more valves, or flaps, may be configured to toggle open, or to toggle to a partially open position, when the pressure on the flap, or on another element in accordance with the present disclosure is above a predetermined amount. Similarly, one or more flaps may be configured to toggle closed, or to toggle to a partially closed position, when the pressure on the flap, or on another element in accordance with the present disclosure is below a predetermined amount. A pressure regulator may be used to control respective opening angles of each of the plurality of flaps.

The air flow control arrangement 212 may include a plurality of flaps (FIG. 2). Each flap F6-F12 may have a first position configured to cover the second side 218 of each cooling tube and to prevent flow through the respective tube while in the first position. Each of the plurality of flaps F6-F12 may have one of: a low level of stiffness configured to enable the flap to flex away from the first position when a pressure within a respective cooling tube is above a first level; an intermediate level of stiffness configured to enable the flap to flex away from the first position when a pressure within a respective cooling tube is above a second level; and a high level of stiffness configured to enable the flap to flex away from the first position when a pressure within a respective cooling tube is above a third level.

For example, the plurality of flaps F6-F12 may include a first set of flaps, for example F6 and F7, covering a first set of cooling tubes T6 and T7. The first set of flaps F6 and F7 may be configured to flex when exposed to a first pressure on one side thereof to thereby open the first set of cooling tubes T6 and T7 to flow therethrough. A second set of flaps, for example F8 and F9, may be positioned to cover a second set of cooling tubes T8 and T9. The second set of flaps F8 and F9 may be configured to flex when exposed to a second pressure on one side thereof to thereby open the second set of cooling tubes T8 and T9 to flow therethrough. A third set of flaps, for example F10-F12 may be positioned to cover a third set of cooling tubes T10-T12. The third set of flaps F10-F12 may be configured to flex when exposed to a third pressure on one side thereof to thereby open the third set of cooling tubes to flow therethrough. The first pressure may be greater than the second pressure and third pressure, and the second pressure may be an intermediate pressure less than the first pressure and greater than the third pressure.

Figure 4A:
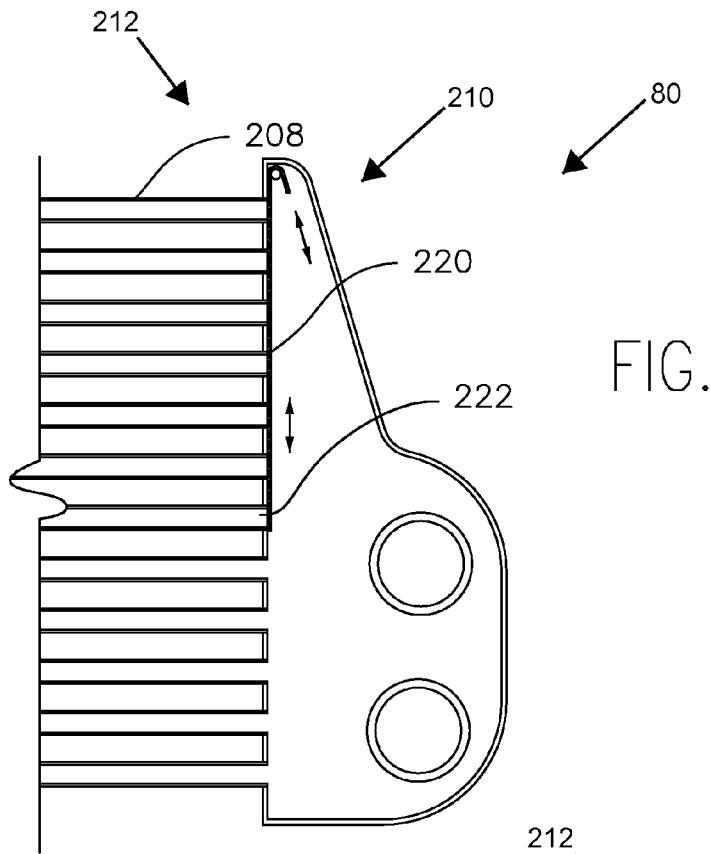
FIGS. 4A and 4B are cross sectional views illustrating another example air flow control arrangement in a respective first position and second position.
Figure 4B:
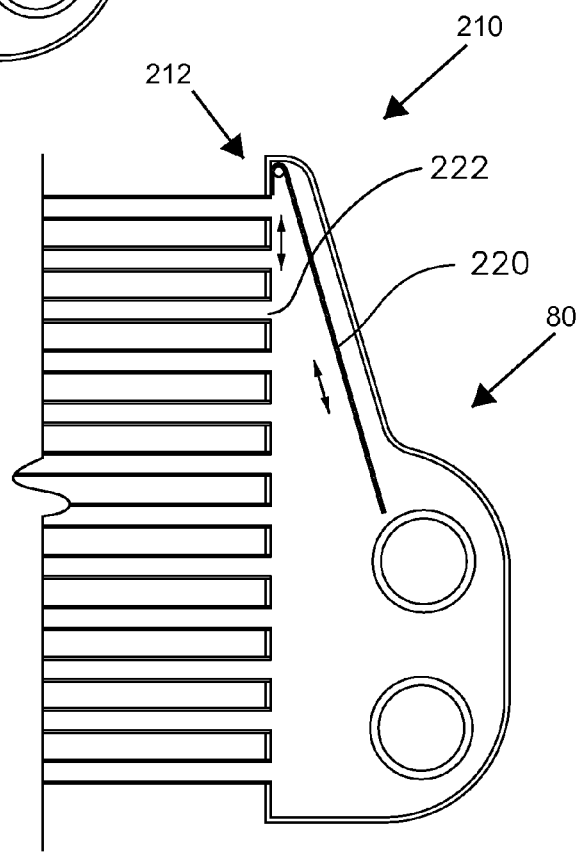

FIGS. 4A and 4B are partial cross sectional views illustrating another example air flow control arrangement in a respective first position and second position. The example embodiment illustrates a charge air cooler 80 and a system 210 wherein the air flow control arrangement 212 may include a slide-able element 220 that may be configured to slide over ends 222, for example ends on the first side 216 (e.g., inlet side), of the plurality of cooling tubes 208 such that the ends 222 are selectively covered or exposed thereby selectively controlling the flow rate of charge air through selective cooling tubes 208. In this way the tube ends 222 may be gradually and progressively exposed to receive charge air. The ends 222 of the tubes 208 may be selectively covered or exposed thereby selectively controlling the flow rate of charge air through selective cooling tubes 208. A controller 12 (FIG. 1) may be configured to receive input from one or more sensors indicating one or more operating conditions of the engine 10, and to send output to an actuator to selectively move the slide-able element 220.

Figure 5:
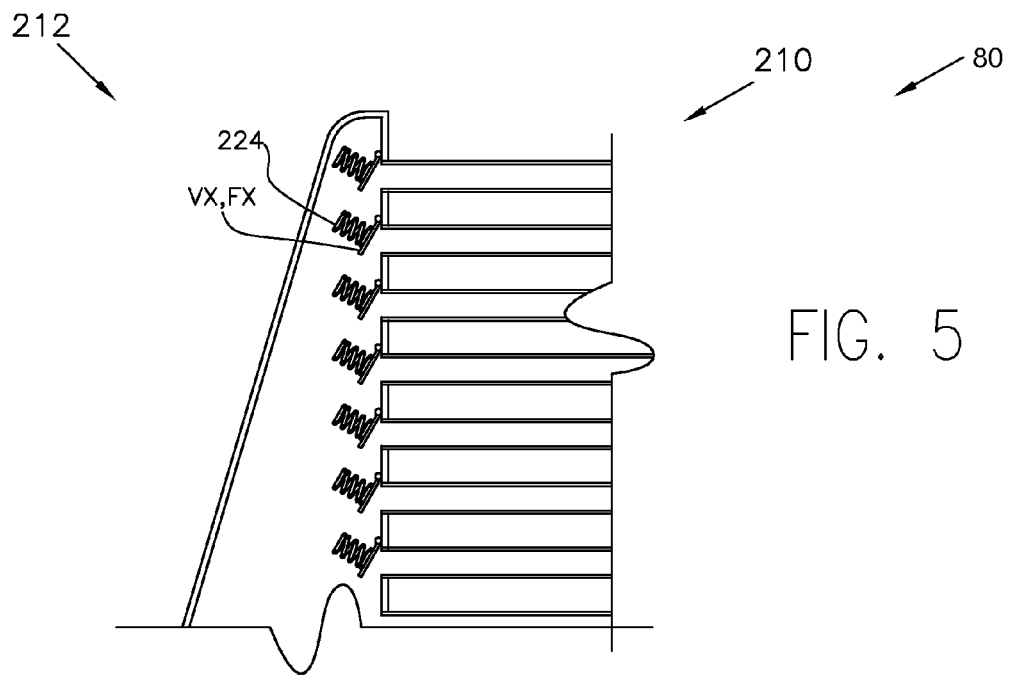
FIG. 5 is a detailed partial cross sectional view of a charge air cooler arrangement showing a further example air flow control arrangement in accordance with the present disclosure.

FIG. 5 is a detailed partial cross sectional view of a charge air cooler arrangement showing another example air flow control arrangement in accordance with the present disclosure. This example shows a case wherein a plurality of valves VX, or flaps FX, may be biased toward a closed position. Each of the plurality of valves VX, or flaps FX, may include a bias 224 configured to bias the respective valve VX, or flap FX toward a closed position with respective preselected bias forces. The bias forces may be determined to cause selected valves to open at individual predetermined pressures. Various bias types may be used, for example coil springs, or torsion springs and the like.

Figure 6:
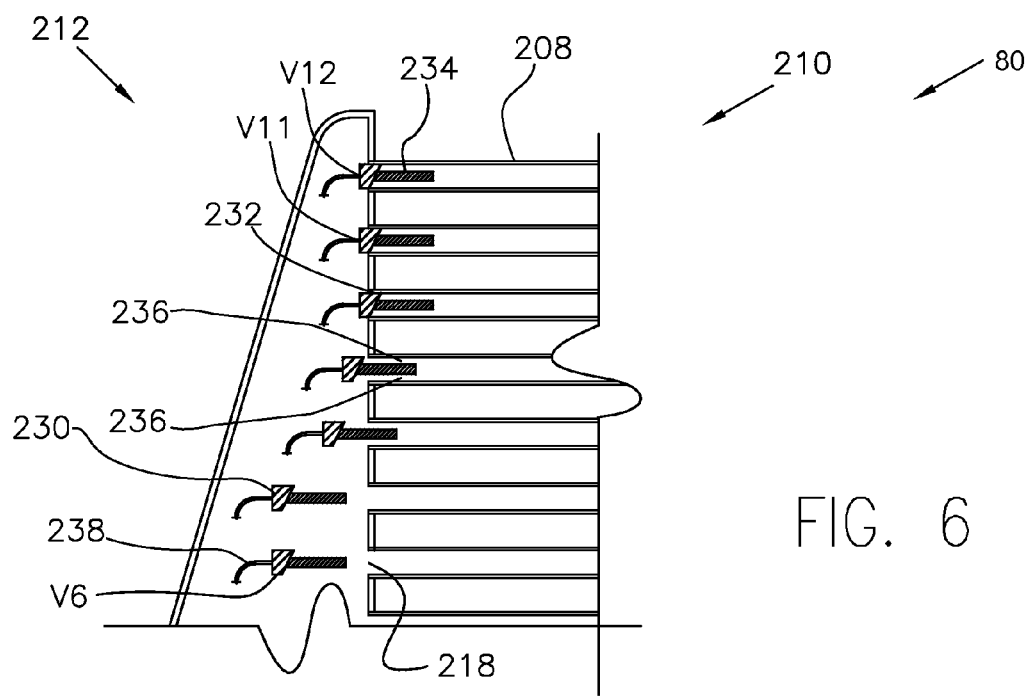
FIG. 6 is a detailed partial cross sectional view of a charge air cooler arrangement showing a still further example air flow control arrangement in accordance with the present disclosure.

FIG. 6 is a detailed partial cross sectional view another example embodiment in accordance with the present disclosure. The plurality of valves V6-V12 may include a movable element 230 selectively movable toward and away from an second side 218 (e.g., outlet end) of each respective cooling tube 208, each movable element may have a first portion 232 configured for sealing engagement with respective second side 218 and an elongate second portion 234 extending from the first portion 232. The second portion 234 may be configured to extend into each respective cooling tube 208 thereby reducing a cross sectional area of at least a portion of a flow path 236 through the respective cooling tube 208 thereby increasing the flow rate of the charge air passing by the elongate second portion 234. Due to the volume taken up by the rod, the airflow path, or passage 236 around the elongate second portion 234 may be smaller, and the airflow may consequently move faster where and when it is present near the end of the rod. In this way each of the movable elements may be configured to selectively increase the flow rate at least an outlet end, as illustrated, of selected cooling tubes. In some cases the movable element 230 may moved with, for example, cables 238. Other means of actuation may also, or instead, be used.

Various embodiments may provide a charge air cooler with a flow regulating arrangement that may include a plurality of movable elements. Each movable element may have a sealing portion configured to prevent access to respective one of the plurality of cooling tubes while in sealing engagement with either the first side or the second side of the respective cooling tube thereby providing no flow through the respective tube. The flow regulating arrangement may also include an elongate portion configured to extend into the respective cooling tube providing an effectively reduced cross-sectional area of flow path within the cooling tube in an area surrounding the elongate member. The elongate portion may be movable with the sealing portion to selectively adjust a length of the reduced cross-sectional area of flow path, and to thereby selectively adjust the flow rate around the area surrounding the elongate member. A controller may be configured to receive input from one or more sensors indicating one or more operating conditions of the engine, and to send output to one or more actuators to selectively move one or more of the movable elements.

Figure 7:
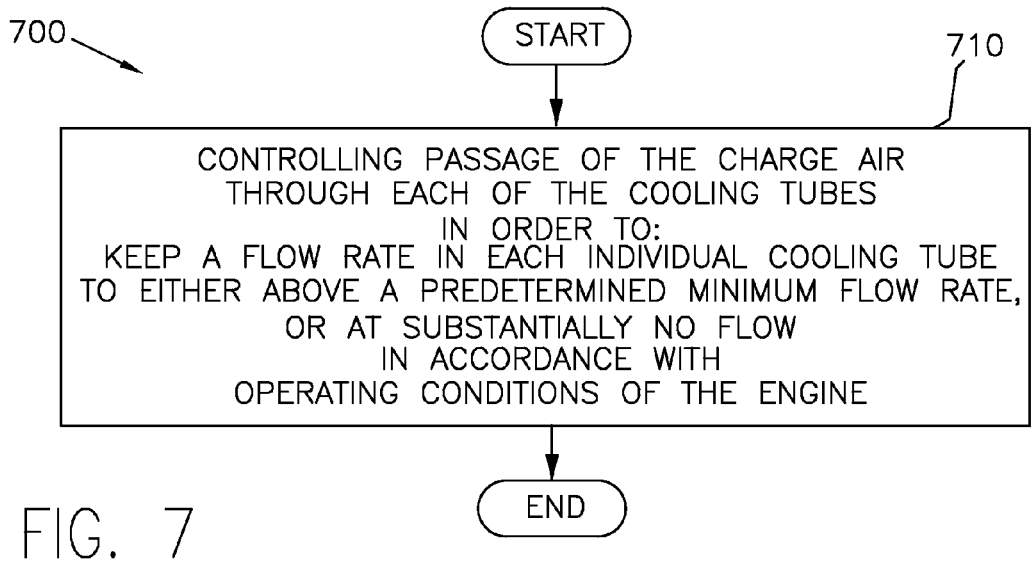
FIG. 7 is a flow diagram illustrating an example method of controlling condensation accumulation within cooling tubes of a charge air cooler.

FIG. 7 is a flow diagram illustrating an example method of controlling condensation accumulation within cooling tubes included in a single charge air cooler, the charge air cooler configured for providing cooled charge air to an engine. The method 700 may include, at 710, controlling passage of the charge air through each of the cooling tubes in order to keep a flow rate in each individual cooling tube to either above a predetermined minimum flow rate, or at substantially no flow in accordance with operating conditions of the engine. The controlling passage of the charge air through each of the cooling tubes may be accomplished passively, or actively. Passive control may be accomplished by arrangements and elements in accordance with the present disclosure. Active control may be accomplished by one or more actuators in accordance with the present disclosure.

The method 700 may include, prior to, and/or while performing the controlling passage of the charge air through each of the cooling tubes 710, monitoring an aggregated flow rate of a charge air passing through the charge air cooler at one or more of: an inlet tank located at an inlet end of the cooling tubes; an outlet tank located at an outlet end of the cooling tubes; an inlet line located upstream from the charge air cooler; and an intake manifold located downstream from the charge air cooler.

Figure 8:
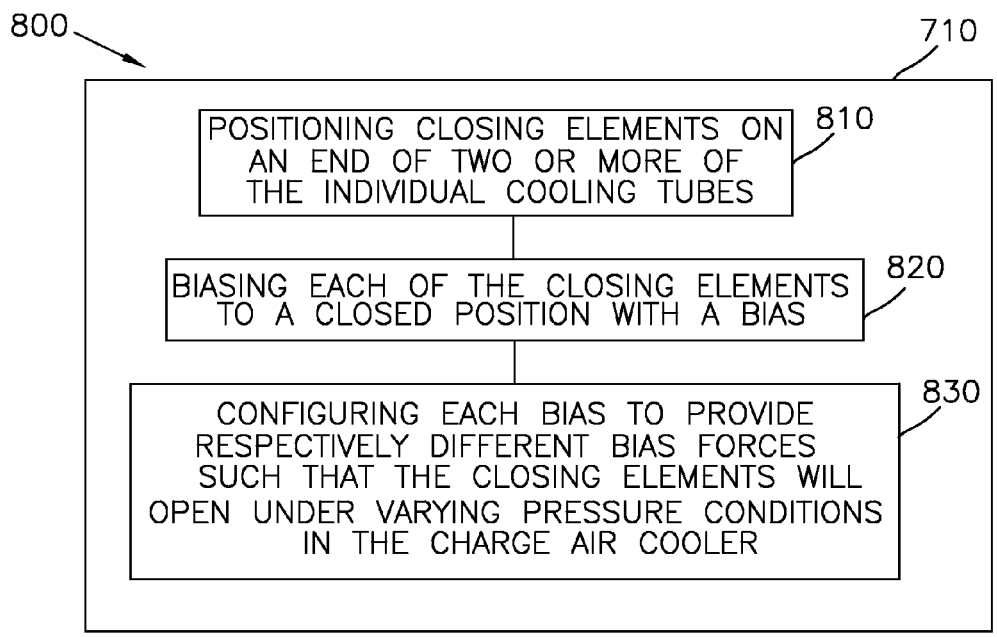
FIG. 8 is a flow diagram illustrating an example modification of the method shown in FIG. 7.

FIG. 8 is a flow diagram illustrating a modification of the method 700 illustrated in FIG. 7. The controlling passage of the charge air through each of the cooling tubes 710 may include, at 810, positioning closing elements on an end of two or more of the individual cooling tubes to restrict flow through each respective cooling tube. The modified method 800 may also include, at 820, biasing each of the closing elements to a closed position with a bias. The method 800 may also include, at 830, configuring each bias to provide respectively different bias forces such that the closing elements will open under varying pressure condition in the charge air cooler.

Figure 9:
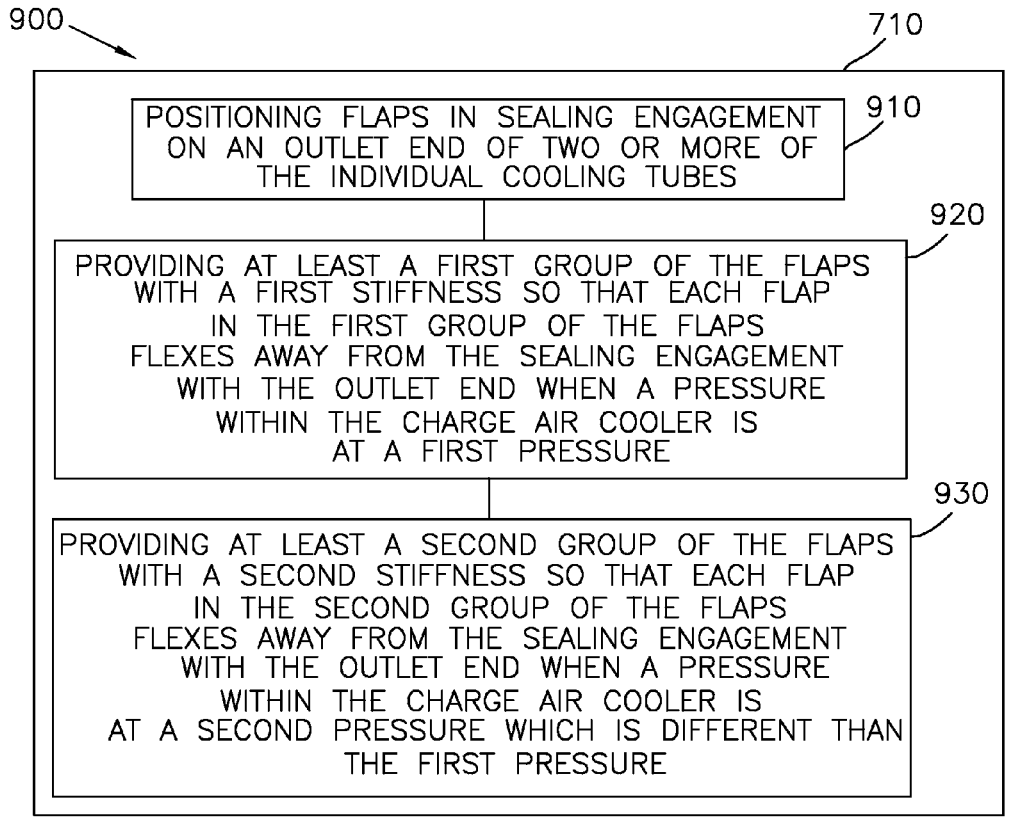
FIG. 9 is a flow diagram illustrating another example modification of the method shown in FIG. 7.

FIG. 9 is a flow diagram illustrating a modification of the method 700 illustrated in FIG. 7. The controlling passage of the charge air through each of the cooling tubes 710 may include, at 910, positioning flaps in sealing engagement on an outlet end of two or more of the individual cooling tubes. The modified method 900 may also include, at 920, providing at least a first group of the flaps with a first stiffness so that each flap in the first group of the flaps flexes away from the sealing engagement with the outlet end when a pressure within the charge air cooler is at a first pressure. The modified method 900 may also include, at 930, providing at least a second group of the flaps with a second stiffness so that each flap in the second group of the flaps flexes away from the sealing engagement with the outlet end when a pressure within the charge air cooler is at a second pressure which is different than the first pressure.

Figure 10:
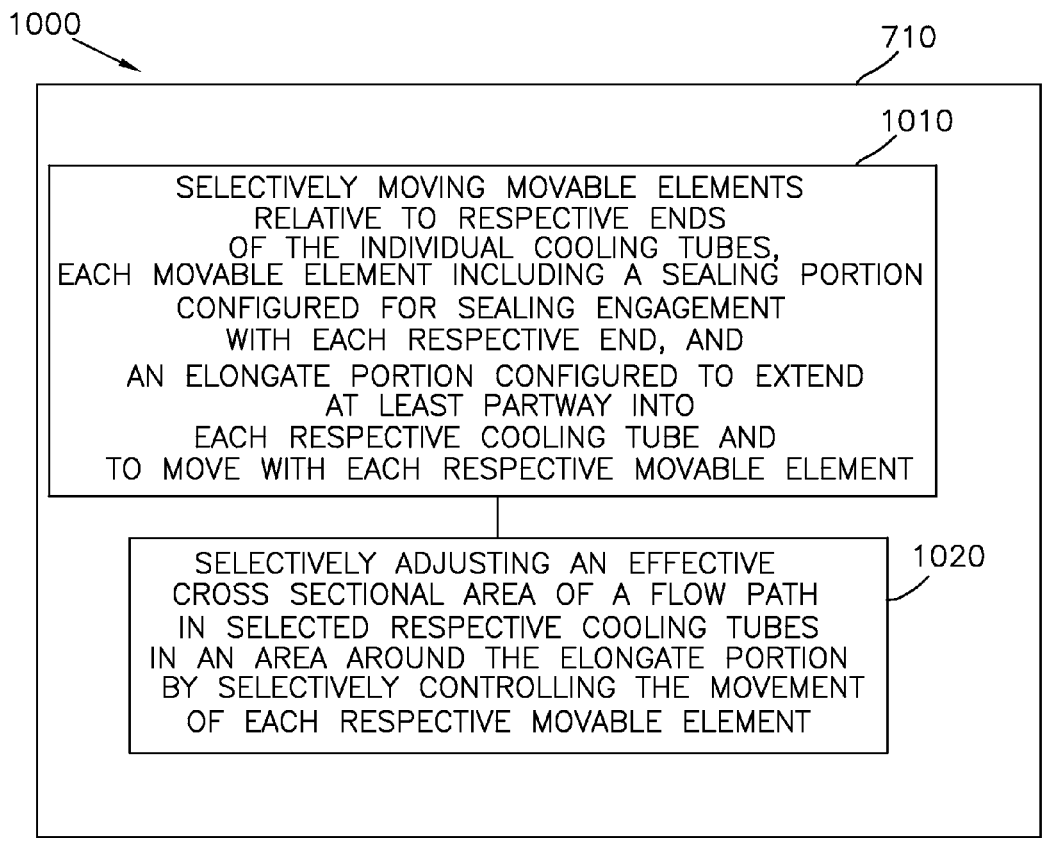
FIG. 10 is a flow diagram illustrating another example modification of the method shown in FIG. 7.

FIG. 10 is a flow diagram illustrating a modification of the method 700 illustrated in FIG. 7. The controlling passage of the charge air through each of the cooling tubes 710 may include, at 1010, selectively moving movable elements relative to respective ends of the individual cooling tubes, each movable element including a sealing portion configured for sealing engagement with each respective end, and an elongate portion configured to extend at least partway into with each respective cooling tube and to move with each respective movable element. The modified method 1000 may also include, at 1020 selectively adjusting an effective cross sectional area of a flow path in selected respective cooling tubes in an area around the elongate portion by selectively controlling the movement of each respective movable element.

Figure 11:
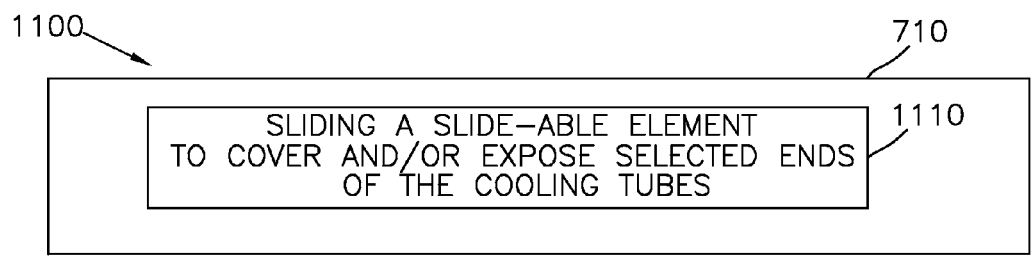
FIG. 11 is a flow diagram illustrating another example modification of the method shown in FIG. 7.

FIG. 11 is a flow diagram illustrating a modification of the method 700 illustrated in FIG. 7. The controlling passage of the charge air through each of the cooling tubes 710 may include, at 1110, sliding a slide-able element to cover and/or expose selected ends of the cooling tubes.

It will be understood that the depicted engine 10 is shown, only for the purpose of example, and that the systems and methods described herein may be implemented in or applied to any other suitable engine having any suitable components and/or arrangement of components.

The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof. For example, in some embodiments a method of operating the charge air cooler may include providing unequal airflow openings to three or more tubes of the charge air cooler during lower flow conditions, and equal opening at higher flow conditions. In some embodiment, the method may include preventing condensation buildup in a charge air cooler, comprising: maintaining a minimum air flow rate through a plurality of three or more tubes of the charge air cooler, and during a first condition, partially or fully opening one or more tubes individually to air flow; and during a second condition, partially or fully closing one or more tubes individually to air flow. In still other embodiment, an engine system may comprise: an intake manifold; an exhaust manifold; a plurality of tubes; a control unit, a plurality of actuators, and a control mechanism adjacent to an intake side of the tubes comprising a sliding shield engaged by the actuators, wherein the shield extends continuously from a first location in which all tubes receive airflow, to a second location in which none of the tubes receive airflow, the shield facilitating or blocking airflow equally or unequally for any number of the plurality of tubes.

The invention claimed is:

1. A system, comprising:
an engine charge air cooler (CAC), including a plurality of regulatable and non-regulatable cooling tubes flowing charge air; and
an air flow control arrangement within the CAC configured to selectively ensure that a flow rate of charge air, from a compressor, through each individual cooling tube of the regulatable cooling tubes is either essentially zero or above a predetermined minimum flow rate in accordance with predetermined operating conditions of an engine, where the air flow control arrangement includes a plurality of valves each configured to selectively provide access to or to restrict access to a respective one or more of the regulatable cooling tubes and where the CAC includes coolant passages flowing coolant over the plurality of regulatable and non-regulatable cooling tubes, the coolant including one or more of ambient air, water, or chemical coolant.

2. The system of claim 1, wherein the predetermined minimum flow rate is 13 m/s and the predetermined operating conditions of the engine include one or more of:
ambient temperature external to the CAC;
ambient pressure external to the CAC;
relative humidity external to the CAC;
engine temperature;
temperature of the CAC;
temperature, and/or pressure, and/or relative humidity, and/or moisture content of the charge air downstream from a turbocharger;
temperature, and/or pressure, and/or relative humidity, and/or moisture content of the charge air upstream from the turbocharger;
temperature, and/or pressure, and/or relative humidity, and/or moisture content in an inlet tank of the CAC; and
temperature, and/or pressure, and/or relative humidity, and/or moisture content at an outlet of the CAC.

3. The system of claim 1, wherein the non-regulatable cooling tubes flow charge air from the compressor and wherein flow through the non-regulatable cooling tubes is always possible.

4. The system of claim 1, wherein the plurality of valves are a plurality of flaps and further comprising a pressure regulator to control respective opening angles of each of the plurality of flaps.

5. The system of claim 4, wherein the plurality of valves are biased toward a closed position, and wherein each of the plurality of valves includes a bias configured to bias the respective valve toward the closed position with respective preselected bias forces, the bias forces determined to cause selected valves to open at individual predetermined pressures.

6. The system of claim 1, wherein the plurality of valves includes:
a first set of flaps covering a first set of cooling tubes of the regulatable cooling tubes and configured to flex when exposed to a first pressure on one side thereof to thereby open the first set of cooling tubes to flow charge air therethrough;
a second set of flaps covering a second set of cooling tubes of the regulatable cooling tubes and configured to flex when exposed to a second pressure on one side thereof to thereby open the second set of cooling tubes to flow charge air therethrough; and
a third set of flaps covering a third set of cooling tubes of the regulatable cooling tubes and configured to flex when exposed to a third pressure on one side thereof to thereby open the third set of cooling tubes to flow charge air therethrough, and the first pressure being greater than the second and third pressure and the second pressure being an intermediate pressure less than the first pressure and greater than the third pressure.

7. The system of claim 1, wherein each of the plurality of valves includes a movable element selectively movable toward and away from an outlet end of each respective regulatable cooling tube, each movable element having a first portion configured for sealing engagement with a respective outlet end and an elongate second portion extending from the first portion, the second portion configured to extend into each respective regulatable cooling tube thereby reducing a cross sectional area of at least a portion of a flow path through the respective regulatable cooling tube thereby increasing the flow rate of the charge air passing by the elongate second portion.

8. A system for a charge air cooler (CAC), comprising:
an air flow control arrangement within the CAC, the CAC including a plurality of regulatable and non-regulatable cooling tubes flowing charge air, configured to selectively ensure that a flow rate of charge air, from a compressor, through each individual cooling tube of the regulatable tubes is either essentially zero or above a predetermined minimum flow rate in accordance with predetermined operating conditions of an engine, where the air flow control arrangement includes a plurality of valves each configured to selectively provide access to or to restrict access to a respective one or more of the regulatable cooling tubes and where the CAC includes coolant passages flowing coolant over the plurality of regulatable and non-regulatable cooling tubes, the coolant including one or more of ambient air, water, or chemical coolant; and
a plurality of valve actuators configured to either open or to close respective selected individual valves.

9. A charge air cooler for use with an engine comprising:
a plurality of regulatable cooling tubes configured to receive charge air from a compressor and a respective first side of each cooling tube and to output the charge air from a respective second side of each cooling tube to an intake manifold of the engine;
a flow regulating arrangement within the charge air cooler and configured to pass the charge air through the plurality of regulatable cooling tubes in a selective way to provide either no flow through a particular tube, or flow at a flow rate above a preselected minimum flow rate;
one or more additional non-regulatable cooling tubes configured to always flow charge air when the engine is operable; and
a plurality of passages configured to flow ambient air from outside a vehicle across the plurality of regulatable and the one or more additional non-regulatable cooling tubes to cool the charge air, wherein the flow regulating arrangement includes a plurality of movable elements, each movable element having:
a sealing portion configured to prevent access to a respective one of the plurality of regulatable cooling tubes while in sealing engagement with either the first side or the second side of the respective cooling tube thereby providing no flow through the respective tube, and an elongate portion configured to extend into the respective regulatable cooling tube providing an effectively reduced cross-sectional area of a flow path within the cooling tube in an area surrounding the elongate portion, the elongate portion being movable with the sealing portion to selectively adjust a length of the reduced cross-sectional area of the flow path, and to thereby selectively adjust the flow rate around the area surrounding the elongate portion; and a controller configured to receive input from one or more sensors indicating one or more operating conditions of the engine, and to send output to one or more actuators to selectively move one or more of the movable elements.

10. A method of controlling condensation accumulation within a single charge air cooler (CAC), the CAC configured for providing cooled charge air to an engine, comprising:

individually controlling passage of charge air from a compressor, through each cooling tube of a plurality of cooling tubes included in the CAC, and to an intake manifold of the engine in order to keep a flow rate in each individual cooling tube to either above a predetermined minimum flow rate, or at substantially no flow in accordance with operating conditions of the engine, while flowing coolant through coolant passages included in the CAC, the coolant including one of ambient air, water, or chemical coolant, wherein the individually controlling passage of the charge air through each of the cooling tubes includes:

positioning flaps in sealing engagement on an outlet end of two or more of the individual cooling tubes;

providing at least a first group of the flaps with a first stiffness so that each flap in the first group of the flaps flexes away from the sealing engagement with the outlet end when a pressure within the CAC is at a first pressure; and providing at least a second group of the flaps with a second stiffness so that each flap in the second group of the flaps flexes away from the sealing engagement with the outlet end when a pressure within the CAC is at a second pressure which is different than the first pressure.

11. The method of claim 10, further comprising, prior to, and/or while individually controlling passage of the charge air through each of the cooling tubes, monitoring an aggregated flow rate of charge air passing through the CAC at one or more of:

an inlet tank located at an inlet end of the cooling tubes;
an outlet tank located at an outlet end of the cooling tubes;
an inlet line located upstream from the CAC; and
an intake manifold located downstream from the CAC.

* * * * *